US012174579B2

(12) United States Patent
Murayama

(10) Patent No.: US 12,174,579 B2
(45) Date of Patent: Dec. 24, 2024

(54) JOINED STRUCTURAL BODY, IMAGE FORMING APPARATUS AND FINISHER

(71) Applicant: CANON KABUSHIKI KAISHA, Tokyo (JP)

(72) Inventor: Shigeo Murayama, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/304,990

(22) Filed: Apr. 21, 2023

(65) Prior Publication Data

US 2023/0350336 A1 Nov. 2, 2023

(30) Foreign Application Priority Data

Apr. 28, 2022 (JP) ................................ 2022-075402

(51) Int. Cl.
*G03G 21/16* (2006.01)
*B41J 29/02* (2006.01)

(52) U.S. Cl.
CPC ..... *G03G 21/1623* (2013.01); *G03G 21/1619* (2013.01); *B41J 29/02* (2013.01)

(58) Field of Classification Search
CPC .. G03G 21/1619; G03G 21/1623; B41J 29/02
See application file for complete search history.

(56) References Cited

U.S. PATENT DOCUMENTS

2009/0169242 A1* 7/2009 Akiyama ........... G03G 21/1633 399/107
2019/0310567 A1* 10/2019 Maeda .................... B29C 66/21
2021/0362974 A1* 11/2021 Kakuta .............. G03G 21/1619
2022/0043370 A1* 2/2022 Mase ................ G03G 15/0893

FOREIGN PATENT DOCUMENTS

JP H07125073 A 5/1995
JP 2010204247 * 9/2010

* cited by examiner

*Primary Examiner* — Sandra Brase
(74) *Attorney, Agent, or Firm* — Canon U.S.A., Inc. IP Division

(57) ABSTRACT

A joined structural body includes a first member having a plate shape and including a first surface, a plurality of first joining portions, and a positioning portion, and a second member joined to the first member, having a plate shape, and including a second surface, a plurality of second joining portions, and a positioned portion engaged with the positioning portion. Distances of the plurality of first joining portions from the positioning portion in a plane perpendicularly intersecting with the thickness direction are different among the plurality of first joining portions. Each of the plurality of first joining portions includes a first rib. Each of the plurality of second joining portions includes a second rib. The first rib and the second rib are joined to each other at an intersecting point where the first rib and the second rib intersect with each other when viewed in the thickness direction.

19 Claims, 7 Drawing Sheets

JOINED STRUCTURAL BODY, IMAGE FORMING APPARATUS AND FINISHER

BACKGROUND

Field

This disclosure relates to a joined structural body in which two or more members are joined to each other, an image forming apparatus for forming an image on a recording material, and a finisher for performing a process on a recording material on which an image has been formed.

Description of the Related Art

As a method to join two or more members, besides ultrasonic welding described in Japanese Patent Laid-Open No. H07-125073, welding with solvent or heat, and adhesion using adhesives, and the like are known.

In industrial products such as image forming apparatuses, so as to ensure the stiffness of plate-shaped units such as exterior cover units while enabling miniaturization of the products, the application of joined structural bodies (joined structures), in which plate-shaped members prepared in advance are joined to each other, is considered. In this case, joining portions distributed on surfaces of the plate-shaped members facing each other are joined to each other by the ultrasonic welding or other joining methods.

However, when a relative position between the joining portions to be joined is deviated, there is a possibility that joining strength may decrease in some of joined portions and it may not be possible to obtain sufficient stiffness and mechanical strength as the joined structure. For example, even if positioning portions are disposed so as to determine the relative position between the plate-shaped members, in a case where distances from the positioning portions are different among a plurality of joining portions, there is a possibility that the relative position between the joining portions to be joined may deviate due to such as manufacturing tolerances of the plate-shaped members.

SUMMARY

The present disclosure provides a joined structural body, an image forming apparatus, and a finisher that can improve stability in joining strength.

According to one aspect of the disclosure, a joined structural body includes a first member having a plate shape and including a first surface, a plurality of first joining portions disposed on the first surface, and a positioning portion, and a second member joined to the first member and having a plate shape, the second member including a second surface facing the first surface in a thickness direction of the first member, a plurality of second joining portions disposed on the second surface and joined to the plurality of first joining portions, and a positioned portion engaged with the positioning portion such that the second member is positioned with respect to the first member in a direction perpendicularly intersecting with the thickness direction, wherein distances of the plurality of first joining portions from the positioning portion in a plane perpendicularly intersecting with the thickness direction are different among the plurality of first joining portions, wherein each of the plurality of first joining portions includes a first rib projecting toward the second surface with respect to the first surface in the thickness direction, wherein each of the plurality of second joining portions includes a second rib that projects toward the first surface with respect to the second surface in the thickness direction and that intersects with the first rib when viewed in the thickness direction, and wherein the first rib and the second rib are joined to each other at an intersecting point where the first rib and the second rib intersect with each other when viewed in the thickness direction.

Further features of the present disclosure will become apparent from the following description of exemplary embodiments with reference to the attached drawings.

DESCRIPTION OF THE EMBODIMENTS

Hereinafter, embodiments of this disclosure will be described with reference to drawings.

Figure 1A:
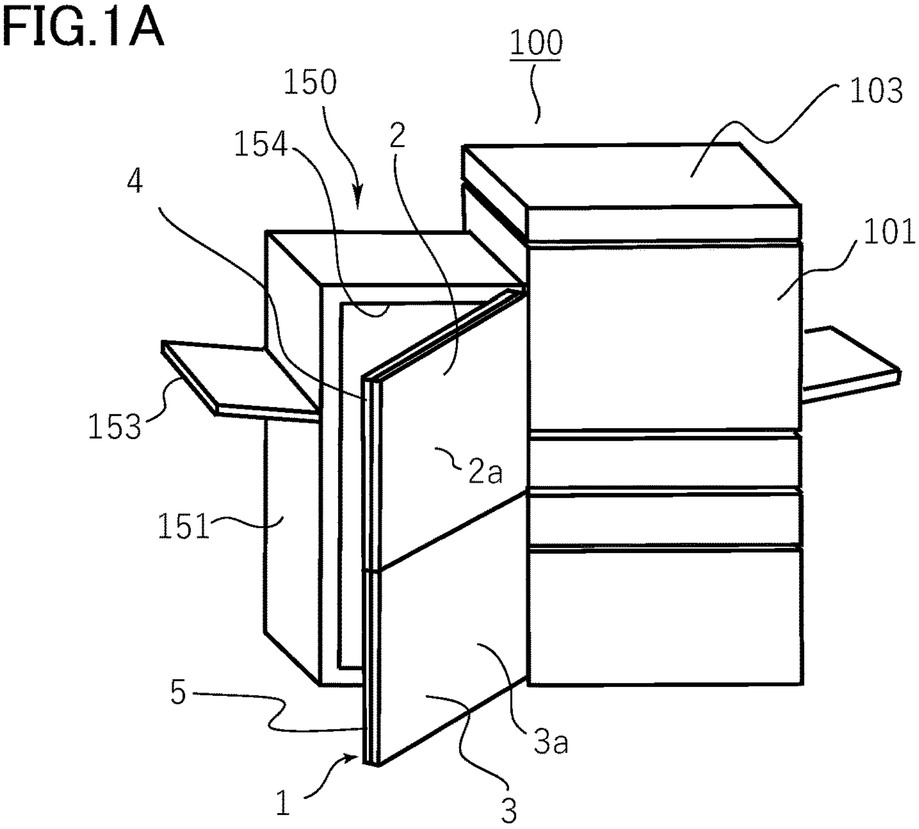
FIG. 1A is a perspective view illustrating an image forming apparatus of an embodiment.

Using FIGS. 1A and 1B, an image forming apparatus 100 will be described as an example of apparatuses into which a joined structural body (joined member, joined structure, joined unit) 1 of this disclosure is assembled. FIG. 1A is a perspective view illustrating the image forming apparatus 100, and FIG. 1B is a schematic diagram illustrating an example of an internal configuration of the image forming apparatus 100.

Figure 1B:
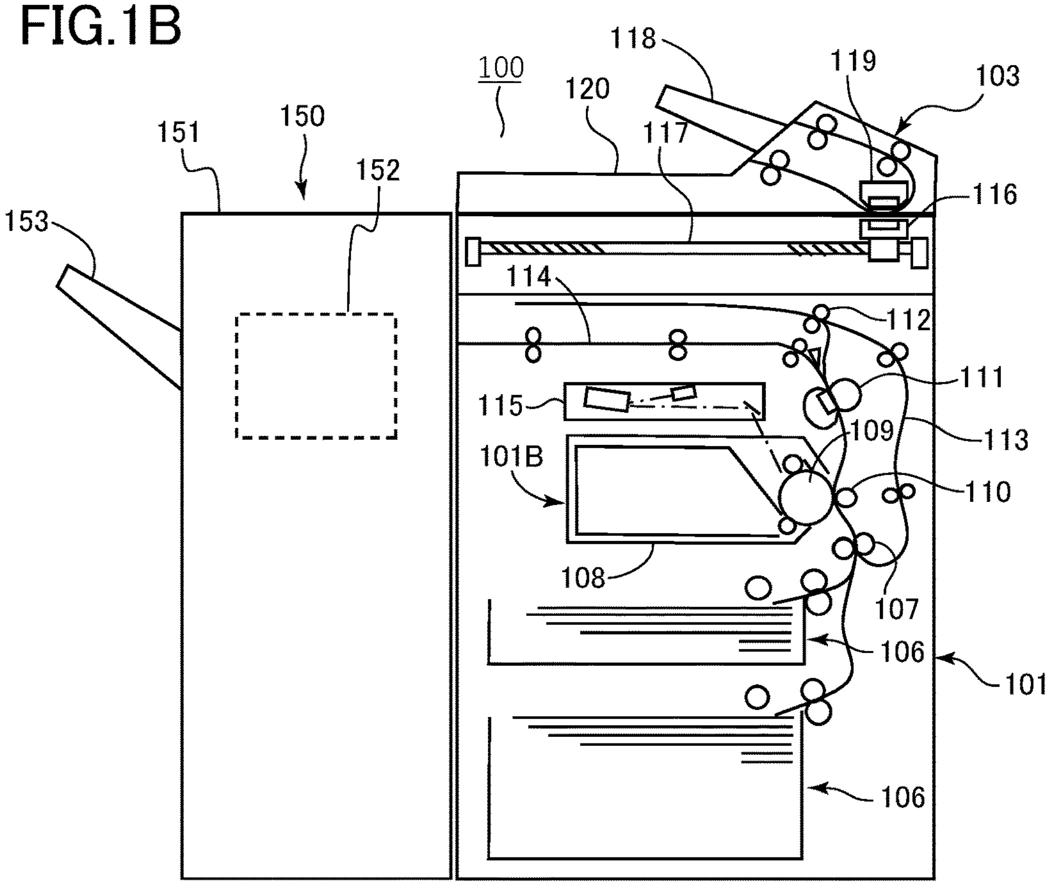
FIG. 1B is a schematic diagram illustrating the image forming apparatus of the embodiment.

As illustrated in FIGS. 1A and 1B, the image forming apparatus 100 includes an image reading apparatus 103, an image forming apparatus body (hereinafter referred to as a printer body 101), and a finisher 150 for performing a process on a recording material on which an image has been formed. The image forming apparatus 100 forms the image on the recording material by an electrophotographic process based on image data read from a document by the image reading apparatus 103 or image data received from an external source, and outputs the recording material after performing the process in accordance with a request from the user.

To be noted, an "image forming apparatus" in the present disclosure includes a single-function printer which forms the image on the recording material based on the image data received from the external source, a copy machine which forms the image on the recording material based on the image data read from a document, and a multi-function machine including a plurality of functions. The image forming apparatus 100 may be a system including an apparatus body equipped with an image forming function as with the printer body 101 and auxiliary equipment (option feeder, stacker, finisher, and the like) connected to the apparatus body. As the recording material, it is possible to use various sheet materials which are different in size and materials, including paper such as standard paper and cardboard, a plastic film, cloth, a surface treated sheet such as coated paper, a sheet material of a special shape such as an envelope and index paper, and the like.

The image reading apparatus 103 includes a document tray 118 on which the document is placed, a document conveying unit for feeding the document from the document tray 118 one sheet at a time, reading sensors 116 and 119 for reading the image data by optically scanning the fed document, and a sheet discharge tray 120 to which the document is discharged. Further, the image reading apparatus 103 can also read the image data from a stationary document placed on a platen glass with the reading sensor 116 moved in a sub-scanning direction by a driving device 117.

The printer body 101 includes an image forming unit 101B of a direct transfer system. The image forming unit 101B includes a cartridge 108 equipped with a photosensitive drum 109, serving as an image bearing member, and a process unit acting on the photosensitive drum 109, a laser scanner unit 115, serving as an exposing unit, and a transfer roller 110, serving as a transfer unit. Further, the printer body 101 includes a fixing unit 111, serving as a fixing unit for fixing a toner image on the recording material. The image forming unit 101B and the fixing unit 111 are disposed in an interior of a casing (frame body and exterior) of the printer body 101.

In a case of performing an image forming operation, an electrostatic latent image is written on a surface of the rotating photosensitive drum 109 by charging the surface of the rotating photosensitive drum 109 by a charge unit and exposing the photosensitive drum 109 based on the image data by the laser scanner 115, serving as the exposing unit. A developing unit develops the electrostatic latent image using developer, and visualizes the image as the toner image (hereinafter simply referred to as an image).

Concurrently with image formation by the image forming unit 101B, the recording material is fed one sheet at a time from a storage 106 disposed in a lower part of the printer body 101. After the skew of the recording material has been corrected in a registration roller 107, the recording material is conveyed to a nip portion (transfer portion) between the photosensitive drum 109 and the transfer roller 110. The transfer roller 110 transfers the image from the photosensitive drum 109 onto the recording material in the transfer portion. In the fixing unit 111, heat treatment is applied to the recording material which has passed through the transfer portion, and the image is fixed on the recording material.

In a case where the image is formed on one side of the recording material, the recording material is discharged from the printer body 101 to a finisher 150 via a sheet discharge path. In a case where the image is formed on both sides of the recording material, the recording material on whose first surface the image has been formed is conveyed in a reversal manner (switchbacked) in a reverse portion 112, and conveyed to the transfer portion again via a duplex conveyance unit 113. Then, the recording material on whose second surface the image has been formed by passing through the transfer portion and the fixing unit 111 is discharged from the printer body to the finisher 150 via the sheet discharge path.

The image forming unit 101B described above is an example of image forming units, it is acceptable to use an electrophotographic unit of an intermediate transfer system in which the toner image formed on a photosensitive member is transferred onto a sheet via an intermediate transfer member. Further, it is acceptable to use a printing unit of an ink jet system or an offset printing system for the image forming unit.

The finisher 150 includes a casing 151 (frame body and exterior), a process unit 152 housed in an interior of the casing 151, and a stacking unit 153 exposed to the outside of the casing 151. The process unit 152 is, for example, a stapler for binding a plurality of sheets of the recording material, a puncher for punching a hole at a predetermined position in the recording material, or a folder for folding the recording material in a manner of a bi-fold, a Z-fold, and the like. It is acceptable that the finisher 150 includes a plurality of process units 152, each performing a predetermined process on the recording material.

The finisher 150 performs the process (or does not perform the process) on the recording material received from the printer body 101 based on the request from the user, and discharge the recording material as a printing product to the stacking unit 153. A control unit of the finisher 150 monitors a stacking amount of the products on the stacking unit 153 by a sensor, not shown, and controls lifting of the stacking unit 153 so that an upper surface of the uppermost product will be maintained at a predetermined height. It is acceptable to dispose a plurality of stacking units 153 in the finisher 150 so as to change discharge destinations of the products depending on the presence/absence of the process or a type of the process.

Exterior Cover Unit

The image forming apparatus 100 includes an exterior cover unit 1, serving as an example of the joined structure. In an example illustrated in FIG. 1A, the exterior cover unit 1 is included in a side surface on the front side of the finisher 150. Further, the exterior cover unit 1 is pivotably supported by the casing 151 of the finisher 150 via a hinge. The exterior cover unit 1 is an example of an opening and closing unit capable of opening and closing (capable of moving) between a closed position where the exterior cover unit 1 covers an opening 154 of the casing 151 and an opening position where the exterior cover unit 1 allows the opening 154 to be exposed. By moving the exterior cover unit 1 from the closed position to the opening position, the user or service personnel can remove the recording material stuck in the interior of the finisher 150 or perform a maintenance (inspection or replacement) of the process unit 152 and other members.

The exterior cover unit 1 is the joined structure in which a plurality of plate-shaped members are joined and integrated into one body. Hereinafter, a configuration example of the exterior cover unit 1, serving as the joined structure, will be described.

Example 1

Figure 2:
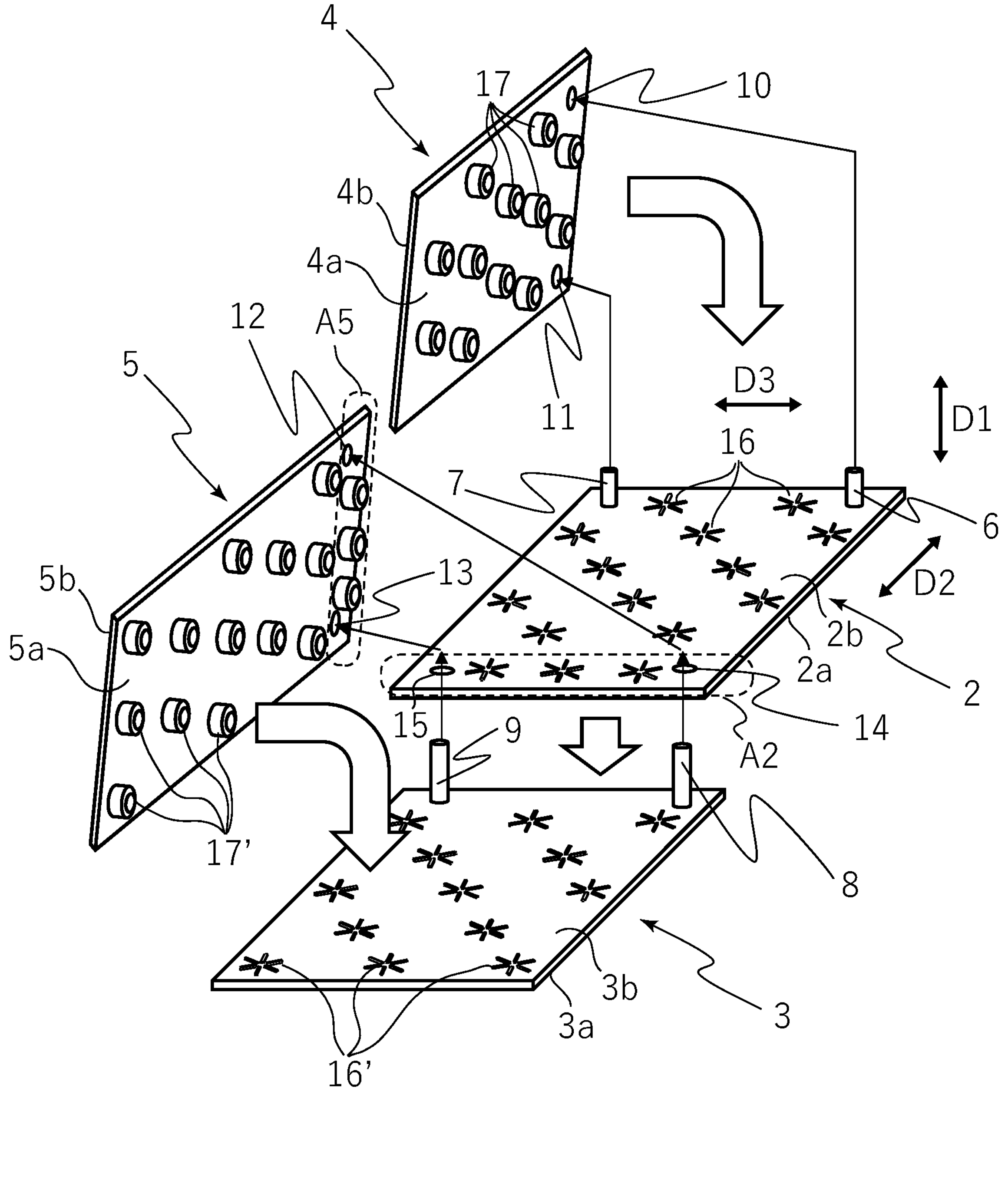
FIG. 2 is an exploded view illustrating an exterior cover unit of an example 1.

FIG. 2 is an exploded view illustrating the exterior cover unit 1 of an example 1. The exterior cover unit 1 of this example includes a first outer cover 2, a second outer cover 3, a first inner cover 4, and a second inner cover 5. The exterior cover unit 1 is the joined structure in which these cover parts (2 to 5) are joined to each other and integrated into one body. The first outer cover 2 is a first member of this example, the first inner cover 4 is a second member of this example, the second outer cover 3 is a third member of this example, and the second inner cover 5 is a fourth member of this example.

The first outer cover 2 (upper side outer cover) is configured to form a surface on an upper side of the front side surface (appearance surface) of an apparatus (in this example, finisher 150) into which the exterior cover unit 1 is to be assembled. The second outer cover 3 (lower side outer cover) is configured to form a surface on a lower side of the front side surface (appearance surface) of the apparatus (finisher 150) into which the exterior cover unit 1 is to be assembled. That is, both of the first and second outer covers 2 and 3 are configured to form the exterior of the casing of the apparatus into which the exterior cover unit 1 is to be assembled. To be noted, the appearance surfaces are surfaces which are visible from the outside in a normal use state of the apparatus. The appearance surfaces of the image forming apparatus include an upper surface, a front surface, a back surface, and both side surfaces.

The first inner cover 4 (upper side inner cover) is configured to form a surface on an upper side on the back of the front side surface (appearance surface) of the apparatus (finisher 150) into which the exterior cover unit 1 is to be assembled. The second inner cover 5 (lower side inner cover) is configured to form a surface on a lower side on the back of the front side surface (appearance surface) of the apparatus (finisher 150) into which the exterior cover unit 1 is to be assembled. That is, the first and second inner covers 4 and 5 are configured to form an inner surface of the casing (in the back surface of the exterior) of the apparatus into which the exterior cover unit 1 is to be assembled.

Each of the cover parts (2 to 5) is a plate-shaped member. That is, each of the cover parts (2 to 5) includes two main surfaces which have larger areas than the other side surfaces. In a state where the cover parts (2 to 5) are integrated into one body as the exterior cover unit 1, thickness directions of the cover parts (2 to 5), i.e., normal directions of the main surfaces, are substantially parallel to each other.

Hereinafter, in a description of a shape of each of the cover parts (2 to 5), the thickness direction of the exterior cover unit 1 that is in a state of being integrated into one body as the exterior cover unit 1 is simply referred to as a thickness direction D1. The vertical direction of the exterior cover unit 1 that is in a state of being assembled into the finisher 150 is referred to as a height direction D2 of the cover parts (2 to 5). The horizontal direction of the exterior cover unit 1 that is in a state of being assembled into the finisher 150 is referred to as a width direction D3 of the cover parts (2 to 5). The thickness, height, and width directions D1, D2, and D3 perpendicularly intersect with each other.

(1. First Outer Cover)

The first outer cover 2 includes an outer surface 2*a*, an inner surface 2*b* on the opposite side of the outer surface 2*a*, first positioning bosses 6 and 7, third positioning holes 14 and 15, and a plurality of first joining portions 16 (joining shape, rib portion).

The outer surface 2*a* is a surface (fifth surface) which is to be the appearance surface of the finisher 150 in the state where the exterior cover unit 1 is assembled into the finisher 150. The inner surface 2*b* is a surface (joining surface, first surface) which faces the first inner cover 4 in the thickness direction D1. In this example, both of the outer and inner surfaces 2*a* and 2*b* extend in a planar shape in the height and width directions D2 and D3.

The first positioning bosses 6 and 7 are positioning portions so as to determine relative positions of the first outer cover 2 and the first inner cover 4. In this example, the first positioning bosses 6 and 7 are disposed on one side (upper end side) of the inner surface 2*b* in the height direction D2 and at corner portions on both sides in the width direction D3. Each of the first positioning bosses 6 and 7 projects from the inner surface 2*b* in the thickness direction D1.

The third positioning holes 14 and 15 are positioned portions for determining relative positions of the first outer cover 2 and the second outer cover 3. When viewed in the thickness direction D1, the third positioning holes 14 and 15 are disposed in positions which correspond to second positioning bosses 8 and 9 (positioning portions), described below. In this example, the third positioning holes 14 and 15 are holes which penetrate from the outer surface 2*a* to the inner surface 2*b*.

The plurality of first joining portions 16 are distributed throughout the inner surface 2*b*. Therefore, among the plurality of first joining portions 16, distances from the first positioning bosses 6 and 7, serving as positioning portions, are different in a plane perpendicular to the thickness direction D1. That is, between at least two first joining portions 16, the distances (shortest distance) from the first positioning bosses 6 and 7 are different.

At least some of the plurality of first joining portions 16 are preferably disposed in a grid pattern on the inner surface 2*b* so that a distance between each neighboring two of the first joining portions 16 will become approximately constant. Thereby, it is possible to join the first outer cover 2 and the first inner cover and 4 to each other across the whole area of the inner surface 2*b* with a substantially uniform joining strength. A grid pattern is not limited to a hexagonal grid, and, for example, a square grid is also acceptable. Further, it is also acceptable to increase the density of the joining portions in a portion where strength is particularly needed. A shape of the first joining portion 16 will be described below.

To be noted, in this example, a number of the first joining portions 16 of the first outer cover 2 is larger than a number of second joining portions 17 of the first inner cover 4. As illustrated in FIG. 2, when viewed in the thickness direction D1, in addition to an area overlapping the first inner cover 4, the inner surface 2*b* of the first outer cover 2 includes an area (hereinafter referred to as an overlapping area A2) which, when viewed in the thickness direction D1, overlaps the second inner cover 5. The first joining portions 16 disposed in the overlapping area A2 of the first outer cover 2 are joined to fourth joining portions 17' in an overlapping area A5, described below, of the second inner cover 5. Equal to or more than two first joining portions 16 are preferably disposed in the overlapping area A2.

(2. First Inner Cover)

The first inner cover 4 includes an outer surface 4*a*, an inner surface 4*b* on the opposite side of the outer surface 4*a*, first positioning holes 10 and 11, and the plurality of second joining portions 17 (joining shape, rib portion).

The outer surface 4*a* is a surface (joining surface, second surface) which faces the first outer cover 2 in the thickness direction D1. The inner surface 4*b* is a surface which is to be on an inner side of the casing of the finisher 150 in the state where the exterior cover unit 1 is assembled into the finisher 150. In this example, both of the outer and inner surfaces 4*a* and 4*b* extend in a planar shape in the height and width directions D2 and D3.

The first positioning holes 10 and 11 are positioned portions into which the first positioning bosses 6 and 7 are fitted. The first positioning hole 10 on one side is disposed in a position which, when viewed in the thickness direction D1, corresponds to the first positioning boss 6 on one side, and the first positioning hole 11 on the other side is disposed in a position which, when viewed in the thickness direction D1, corresponds to the first positioning boss 7 on the other side. The first positioning holes 10 and 11 are holes which penetrate from the outer surface 4*a* to the inner surface 4*b*.

The plurality of second joining portions 17 are portions which are joined to the plurality of first joining portions 16. The plurality of second joining portions 17 are distributed throughout the outer surface 4*a*. Therefore, among the plurality of second joining portions 17, distances from the first positioning holes 10 and 11, serving as positioned portions, are different in a plane perpendicular to the thickness direction D1. That is, between at least two second joining portions 17, the distances (shortest distance) from the first positioning holes 10 and 11 are different. When viewed in the thickness direction D1, the plurality of second joining portions 17 are disposed in positions which correspond to the plurality of first joining portions 16. A shape of the second joining portion 17 will be described below.

(3. Second Outer Cover)

The second outer cover 3 includes an outer surface 3*a*, an inner surface 3*b* on the opposite side of the outer surface 3*a*, the second positioning bosses 8 and 9, and a plurality of third joining portions 16' (joining shape, rib portion).

The outer surface 3*a* is a surface which is to be the appearance surface of the finisher 150 in the state where the exterior cover unit 1 is assembled into the finisher 150. The inner surface 3*b* is a surface (joining surface, third surface) which faces the second inner cover 5 in the thickness direction D1. In this example, both of the outer and inner surfaces 3*a* and 3*b* extend in a planar shape in the height and width directions D2 and D3.

The second positioning bosses 8 and 9 are positioning portions so as to determine the relative positions of the first and second outer covers 2 and 3. In this example, the second positioning bosses 8 and 9 are disposed on one side (upper end side) of the inner surface 3*b* in the height direction D2 and at corner portions on both sides in the width direction D3. Each of the second positioning bosses 8 and 9 projects from the inner surface 3*b* in the thickness direction D1.

The plurality of third joining portions 16' are distributed throughout the inner surface 3*b*. Therefore, among the plurality of third joining portions 16', distances from the second positioning bosses 8 and 9, serving as positioning portions, are different in a plane perpendicular to the thickness direction D1. That is, between at least two of the third joining portions 16', the distances (shortest distance) from the second positioning bosses 8 and 9 are different.

At least some of the plurality of third joining portions 16' are preferably disposed in the grid pattern on the inner surface 3*b* so that a distance between each neighboring two of the third joining portions 16' will become approximately constant. Further, it is also acceptable to increase the density of the joining portions in a portion where strength is particularly needed. A shape of the third joining portion 16' can be the same shape as the first joining portion 16.

(4. Second Inner Cover)

The second inner cover 5 includes an outer surface 5*a*, an inner surface 5*b* on the opposite side of the outer surface 5*a*, second positioning holes 12 and 13, and the plurality of fourth joining portions 17' (joining shape, rib portion).

The outer surface 5*a* is a surface (joining surface, fourth surface) which faces the second outer cover 3 in the thickness direction D1. The inner surface 5*b* is a surface which is to be on the inner side of the casing of the finisher 150 in the state where the exterior cover unit 1 is assembled into the finisher 150. In this example, both of the outer and inner surfaces 5*a* and 5*b* extend in a planar shape in the height and width directions D2 and D3.

The second positioning holes 12 and 13 are positioned portions into which the second positioning bosses 8 and 9 are fitted. The second positioning hole 12 on one side is disposed in a position which, when viewed in the thickness direction D1, corresponds to the second positioning boss 8 on one side, and the second positioning hole 13 on the other side is disposed in a position which, when viewed in the thickness direction D1, corresponds to the second positioning boss 9 on the other side. Each of the second positioning holes 12 and 13 is a hole which penetrates from the outer surface 5*a* to the inner surface 5*b*.

The plurality of fourth joining portions 17' are portions which are joined to the plurality of third joining portions 16'. The plurality of fourth joining portions 17' are distributed throughout the outer surface 5*a*. Therefore, among the plurality of fourth joining portions 17', distances from the second positioning holes 12 and 13, serving as positioned portions, are different in a plane perpendicular to the thickness direction D1. That is, between at least two of the fourth joining portions 17', the distances (shortest distance) from the second positioning holes 12 and 13 are different. When viewed in the thickness direction D1, the plurality of fourth joining portions 17' are disposed in positions which correspond to the plurality of third joining portions 16'. A shape of the fourth joining portions 17' can be the same shape as the second joining portions 17.

To be noted, in this example, a number of the fourth joining portions 17' of the second inner cover 5 is larger than a number of the third joining portions 16' of the second outer cover 3. As illustrated in FIG. 2, when viewed in the thickness direction D1, in addition to an area overlapping the second outer cover 3, the outer surface 5*a* of the second inner cover 5 includes the overlapping area A5 which, when viewed in the thickness direction D1, overlaps the first outer cover 2. When viewed in the thickness direction D1, the fourth joining portions 17' disposed in the overlapping area A5 of the second outer cover 5 are disposed in positions which correspond to positions of the first joining portions 16 disposed in the overlapping area A2, described above, of the first outer cover 2.

(5. Method for Assembling Exterior Cover Unit)

With respect to the direction perpendicular to the thickness direction D1, the relative positions of the four cover parts (2 to 5) included in the exterior cover unit 1 are regulated by engagement of the positioning portions with the positioned portions. In particular, by fitting the first positioning bosses 6 and 7 of the first outer cover 2 respectively into the first positioning holes 10 and 11 of the first inner cover 4, the relative positions and the rotational displacement of the first outer cover 2 and the first inner cover 4 in the height and width directions D2 and D3 are regulated. Further, by fitting the second positioning bosses 8 and 9 of the second outer cover 3 respectively into the second positioning holes 12 and 13 of the second inner cover 5, the relative positions and the rotational displacement of the second outer cover 3 and the second inner cover 5 in the height and width directions D2 and D3 are regulated. Further, by fitting the second positioning bosses 8 and 9 of the second outer cover 3 respectively into the third positioning holes 14 and 15 of the first outer cover 2, the relative positions and the rotational displacement of the first outer cover 2 and the second outer cover 3 in the height and width directions D2 and D3 are regulated. As described above, all of the relative positions of the four cover parts (2 to 5) are regulated.

For example, the relative position of each of the cover parts (2 to 5) is determined by the following steps:

(a) The first and second outer covers 2 and 3 are placed on a receiving table, not shown, in such a manner that surfaces (outer surfaces 2*a* and 3*a*) on the side of the appearance surface face the receiving table. At this time, the second positioning bosses 8 and 9 are fitted into the third positioning holes 14 and 15.

(b) The first and second inner covers 4 and 5 are respectively stacked on the first and second outer covers 2 and 3. At this time, the first positioning bosses 6 and 7 are respectively fitted into the first positioning holes 10 and 11, and the second positioning bosses 8 and 9 are respectively fitted into the second positioning holes 12 and 13.

Then, by joining the joining portions disposed in the joining surfaces which face each other by ultrasonic welding or other joining methods, the four cover parts (2 to 5) are integrated into one body, and the exterior cover unit 1, serving as the joined structure, is formed. In particular, by joining the plurality of first joining portions 16 disposed in the inner surface 2*b* of the first outer cover 2 to the plurality of second joining portions 17 disposed in the outer surface 4*a* of the first inner cover 4, the first outer cover 2 and the first inner cover 4 are integrated into one body. By joining the plurality of third joining portions 16' disposed in the inner surface 3*b* of the second outer cover 3 to the plurality of fourth joining portions 17' disposed in the outer surface 5*a* of the second inner cover 5, the second outer cover 3 and the second inner cover 5 are integrated into one body. Further, by joining the first joining portions 16 disposed in the overlapping area A2 of the first outer cover 2 to the fourth joining portions 17' disposed in the overlapping area A5 of the second inner cover 5, the first outer cover 2 and the second inner cover 5 are integrated into one body.

In a case where the ultrasonic welding is used as a joining method, in conjunction with molding each of the cover parts (2 to 5) with a resin material, the joining steps are performed as follows:

(c) In a state where each of the cover parts (2 to 5) has been positioned on the receiving table by the steps (a) and (b) described above, an ultrasonic welding horn is brought into contact with the second and fourth joining portions 17 and 17' from above, that is, from sides of the inner surfaces 4*b* and 5*b* of the first and second inner covers 4 and 5.

For the ultrasonic welding horn described above, a small size horn, for example, with a diameter of 10 millimeters (mm) is used in accordance with shapes of the second and fourth joining portions 17 and 17'. Further, it is suitable that the second and fourth joining portions 17 and 17' are recess portions (for example, bottomed cylindrical recess portion, also refer to FIG. 6) recessed from the inner surfaces 4*b* and 5*b* in the thickness direction D1 so as to form a space for accepting the small size horn.

In the step (c), the horn is oscillated in a pressure contact with the back side of the second and fourth joining portions 17 and 17'. Then, energy directors (second rib 17*a*, described below) of the second and fourth joining portions 17 and 17' are momentarily melted in positions in which the energy directors of the second and fourth joining portions 17 and 17' is in contact with rib shapes of the first and third joining portions 16 and 16'. Thereby, the second and fourth joining portions 17 and 17' are joined to the first and third joining portions 16 and 16', and the cover parts (2 to 5) are joined and integrated into one body.

In a case of sequentially welding a plurality of joining points by the ultrasonic welding, it is suitable that the welding is performed in the order of gradually moving away from points adjacent to the positioning bosses 6 to 9. Thereby, it is possible to reduce effects of a distortion generated before and after the welding due to a difference in height between each component.

To be noted, in a case where the adhesion using the adhesive is performed as the joining method, before stacking the cover parts on each other in the step (b) described above, at least one of the joining portions facing each other is coated with the adhesive. Further, in the case of the adhesion, it is acceptable to use a material (for example, metal) other than resin for the first and second joining portions 16 and 17.

(6. Details of Shape of Joining Portion)

Next, the shape of the joining portions of the example 1 and its advantage will be described. To be noted, in this example, each of the third joining portions 16' has substantially the same rib shape as each of the first joining portions 16 (first rib 16*a*) described below. Further, each of the fourth joining portions 17' has substantially the same rib shape as each of the second joining portions 17 (second rib 17*a*) described below. Further, while, hereinafter, configurations of the first and second joining portions 16 and 17 will be described by focusing on one of the plurality of first joining portions 16 and one of the plurality of second joining portions 17, the other portions of the first and second joining portions 16 and 17 also include substantially the same configurations.

Figure 3A:
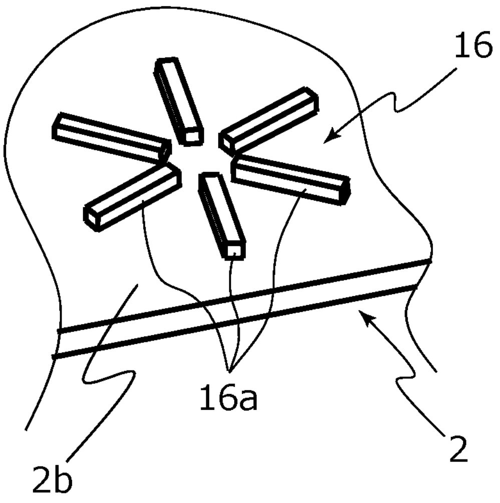
FIGS. 3A to 3C are each a diagram illustrating rib shapes of joining portions of the example 1.
Figure 3B:
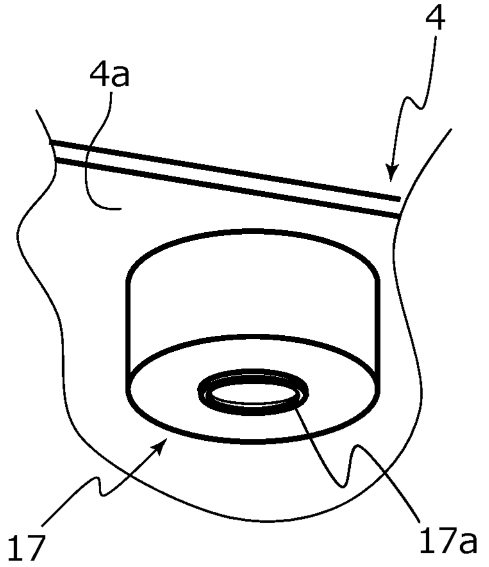
Figure 3C:
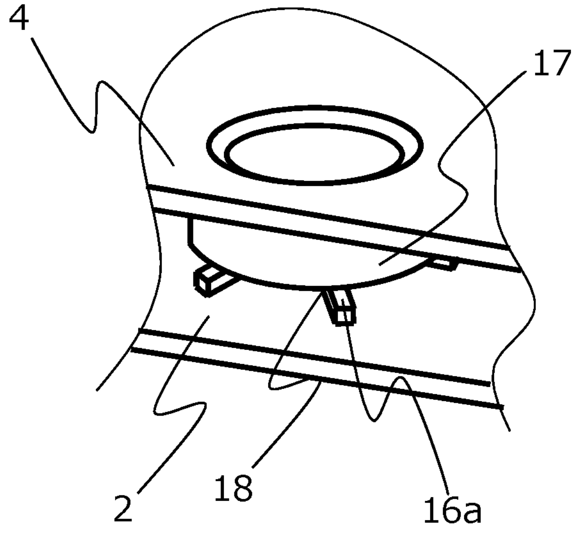

FIG. 3A is a perspective view illustrating a shape of the first rib 16*a* included in the first joining portion 16. FIG. 3B is a perspective view illustrating a shape of the second rib 17*a* included in the second joining portion 17. FIG. 3C is a perspective view illustrating a state in which the first and second joining portions 16 and 17 are joined together.

As illustrated in FIG. 3A, the first joining portion 16 of this example includes the plurality of first ribs 16*a*. When viewed in the thickness direction D1, the plurality of first rib 16*a* extend radially from a predetermined reference point (nominal joining position to the second joining portion 17). In an example illustrated in FIG. 3A, the first joining portion 16 includes six first ribs 16*a* extending radially at angle intervals of 60 degrees between each other. Each of the first ribs 16*a* projects from the inner surface 2*b* of the first outer cover 2 toward the first inner cover 4 in the thickness direction D1. That is, with respect to the inner surface 2*b* (the first surface) of the first outer cover 2, the first rib 16*a* projects toward the outer surface 4*a* (the second surface) of the first inner cover 4 in the thickness direction D1.

As illustrated in FIG. 3B, when viewed in the thickness direction D1, the second joining portion 17 of this example includes the second rib 17*a* which draws a closed curve surrounding a predetermined reference point (nominal joining position to the first joining portion 16). In an example illustrated in FIG. 3B, the second rib 17*a* is in a circular rib shape around the predetermined reference point as a center. The second rib 17*a* is disposed on the bottom of a bottomed cylindrical projection portion projecting from the outer surface 4*a* of the first inner cover 4 toward the first outer cover 2 in the thickness direction D1. That is, with respect to the outer surface 4*a* (the second surface) of the first inner cover 4, the second rib 17*a* projects toward the inner surface 2*b* (the first surface) of the first outer cover 2 in the thickness direction D1.

When viewed in the thickness direction D1, inside ends of the plurality of first ribs 16*a* are positioned on a circumference with a diameter smaller than a diameter of the second rib 17*a*, and outside ends of the plurality of first ribs 16*a* are positioned on a circumference with a diameter larger than the diameter of the second rib 17*a*. That is, when viewed in the thickness direction D1, the plurality of first ribs 16*a* extend from the outside to the inside of the second rib 17*a*, while intersecting with the second rib 17*a* drawing the closed curve.

Figure 4A:
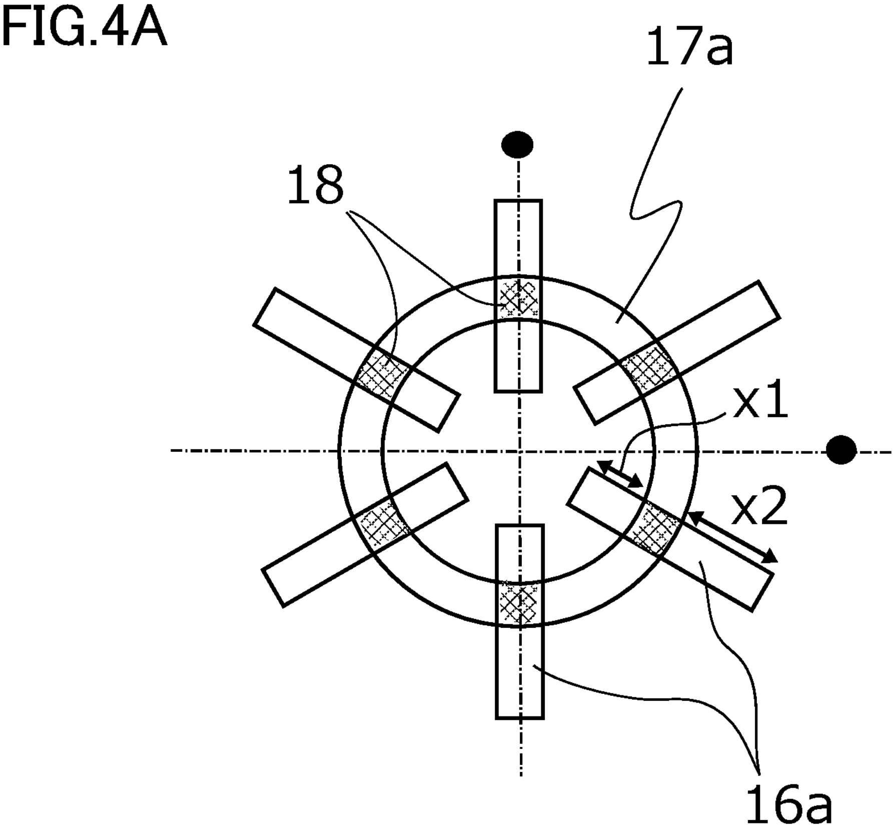
FIGS. 4A and 4B are each a diagram illustrating contact surfaces of the rib shapes of the example 1.
Figure 4B:
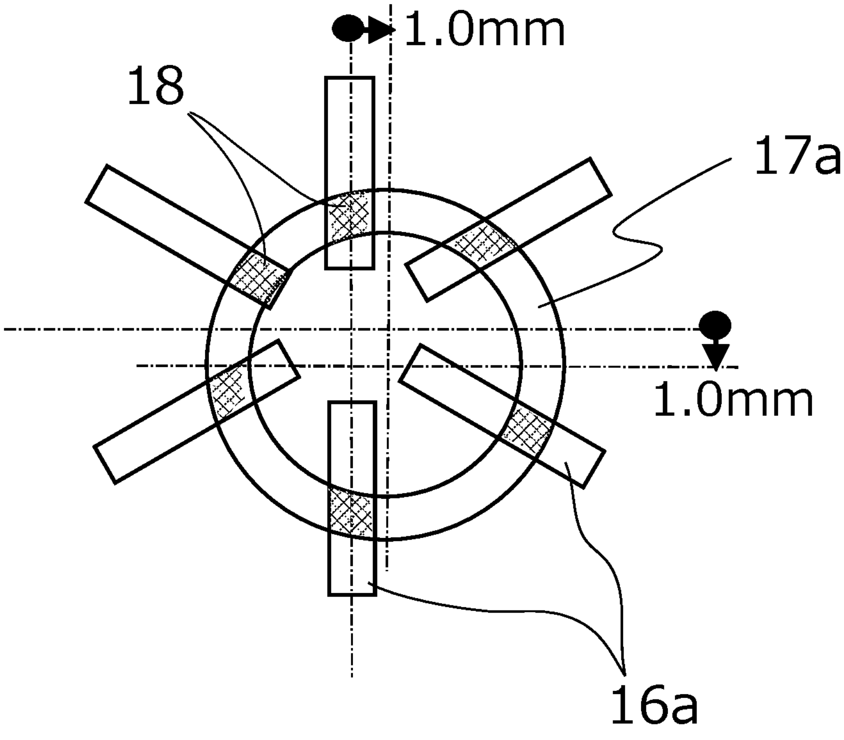

FIGS. 4A and 4B illustrate a positional relationship, in a plane perpendicular to the thickness direction D1, between the first and second ribs 16*a* and 17*a* in a state where the first inner cover 4 is stacked on the outer cover 2 during assembly. Hatched areas in FIGS. 4A and 4B indicate intersecting points 18 which are portions in which the first and second ribs 16*a* and 17*a* substantially come in contact with each other. The intersecting points 18 can be referred to as areas in which the first and second ribs 16*a* and 17*a* are fixed together when the first and second ribs 16*a* and 17*a* are joined by the ultrasonic welding and the like. The sum of areas (hatched areas) in which, when viewed in the thickness direction D1, the first and second ribs 16*a* and 17*a* overlap each other is referred to as a joining area of the first and second joining portions 16 and 17.

As an example, it is assumed that a width of each of the first ribs 16*a* is 1 mm, and that an outside diameter and width of the second rib 17*a* are respectively 9 mm and 1 mm. Here, the second rib 17*a* is a rib having a triangle cross-sectional shape suitable for the energy director for the ultrasonic welding. The abovementioned outside diameter is a diameter of a circle drawn by the base portion of the second rib 17*a* on an outer diameter side, and the width is the width of the second rib 17*a* on the base portion.

FIG. 4A illustrates a case where deviation does not exist in the relative position (positions in the height and width directions D2 and D3) between the first and second joining portions 16 and 17. As described above, since the second rib 17*a* is shaped in the closed curve and the first ribs 16*a* extend radially from the inside to the outside of the second rib 17*a*, when viewed in the thickness direction D1, the first ribs 16*a* intersect with the second rib 17*a* in six intersecting points 18. Therefore, when the horn is oscillated by being brought into contact with and pressed onto the back surface of the second joining portion 17, the second rib 17*a* is melted and integrated with the first ribs 16*a* in each of the intersecting points 18. Further, in a case of performing the adhesion, the second rib 17*a* is adhered to the first ribs 16*a* in each of the intersecting points 18.

FIG. 4B illustrates a case where the deviation occurs in the relative position between the first and second joining portions 16 and 17. Here, it is assumed that the reference point of the second joining portion 17 is deviated from the reference point of the first joining portion 16 by 1 mm each in the height and width directions D2 and D3 (that is, $\sqrt{2}$ mm in a lower right direction in FIG. 4B).

As illustrated in FIG. 4B, according to this example, even in a case where the deviation occurs in the relative position between the first and second joining portions 16 and 17, in the state viewed in the thickness direction D1, the second rib 17*a* still intersects with the first ribs 16*a* in six intersecting points 18.

Further, there is little difference in the sum of the areas (joining area) in which the first ribs 16*a* overlap the second rib 17*a* when viewed in the thickness direction D1, between a case of FIG. 4A in which there is no deviation and a case of FIG. 4B in which the deviation exists. This is because the second rib 17*a* is shaped in the closed curve and the first ribs 16*a* are disposed so as to extend radially from the inside to the outside of the second rib 17*a*.

Thereby, even in the case where a certain extent of the deviation exists in the relative position between the first and second joining portions 16 and 17, it is possible to join the first and second joining portions 16 and 17 to each other with a stable joining strength. In particular, since the first ribs 16*a* are disposed in the radial pattern having rotational symmetry (sixfold symmetry), while the second rib 17*a* is shaped in the circular shape, it is possible to greatly reduce a change in the joining area of the first and second ribs 16*a* and 17*a* with respect to the deviation between the first and second joining portions 16 and 17.

To be noted, in the example described above, by assuming that a maximum value of a positional deviation amount between the first and second joining portions 16 and 17 is $\sqrt{2}$ mm, the outside diameter of the second rib 17*a* is set at 9 mm. In a case where an expected positional deviation amount is large, a length of each of the first ribs 16*a* will be changed appropriately in conjunction with enlarging the diameter of the second rib 17*a*.

As illustrated in FIG. 4A, in the state where the positional deviation of the first and second joining portions 16 and 17 does not exist, projecting lengths of the first rib 16*a* to the inside and to the outside of the second rib 17*a* are respectively referred to as x1 and x2. At this time, if a relative positional deviation amount between the first and second joining portions 16 and 17 is equal to or less than the smaller of the two of x1 and x2, the joining area of the first and second joining portions 16 and 17 does not change greatly. That is, the larger minimum values of lengths x1 and x2 are, the more unlikely the joining strength is impaired even if the positions of the first and second joining portions 16 and 17 are greatly deviated (in other words, allowance of positional deviation amount is increased). In the abovementioned example, both of x1 and x2 are larger than $\sqrt{2}$ mm. The lengths x1 and x2 are, for example, set at values larger than the rib widths of the first and second ribs 16*a* and 17*a*. Thereby, even if the relative position between the first and second joining portions 16 and 17 is deviated by as much as the rib widths, it is possible to avoid a reduction of the joining strength.

As with the exterior cover unit 1, in a case where plate-shaped members are joined and integrated into one body, a certain extent of deviation in a relative position between the joining portions to be joined usually occurs due to a dimensional tolerance of each of the plate-shaped members and deviation in a shape of each of the plate-shaped members caused by such as a warp. For example, in a case where the covers (2 to 5) are molded by such as injection molding, there is a possibility that the warp will occur. If the joining is performed in a state where the joining area of the first and second joining portions 16 and 17 is insufficient due to such a shape deviation, the joining area becomes insufficient in some of the joining positions between the plurality of first and second joining portions 16 and 17, and the joining strength is reduced. It is confirmed that, in a case where circularly shaped ribs each having an outside diameter of 9 mm, a rib width of 1 mm, and a positional accuracy of 0.5 mm are joined to each other, if a relative positional deviation of 1 mm occurs, the joining area is possibly reduced to about 20% with respect to a state in which the positional deviation does not exist. Consequently, the joining strength is reduced in part of the exterior cover unit 1, which is the joined structure, and, sometimes, it is not possible to obtain desired stiffness and strength.

On the other hand, according to this example, even in the state where a certain extent of the deviation exists in the relative positions, it is possible to join the plurality of first and second joining portions 16 and 17 with the stable joining strength, and possible to impart the desired stiffness and strength to the exterior cover unit 1. That is, in the configuration in which the distances from the positioning portions (first positioning bosses 6 and 7) are different among the plurality of first joining portions 16, the positional deviation amount between one of the first joining portions 16 and the second joining portion 17 corresponding to this first joining portion 16 sometimes becomes different depending on a place in the covers (2 and 3) due to such as manufacturing tolerances of the covers (2 and 3). Even in such a case, it is possible to join the plurality of first joining portions 16 respectively to the plurality of second joining portions 17 with the stable joining strength. For example, in a case where relatively large size cover members in which some of a plurality of joining portions have distances from positioning portions over 30 centimeters (cm) are joined to each other, it is possible to join the joining portions to each other with the stable joining strength.

According to this example, even if the relative position between the first and second joining portions 16 and 17 is deviated due to variations in the shapes of the covers (2 to 5), it is possible to join the first and second joining portions 16 and 17 in the same number of the joining points (intersecting points 18) as a case where the positional deviation does not exist. Further, even if the relative position between the first and second joining portions 16 and 17 is deviated due to the variations in the shapes of the covers (2 to 5), it is possible to ensure approximately the same joining area as the case where the positional deviation does not exist. Further, since the rib shapes of one of the first joining portion 16 and the rib shape of one of the second joining portion 17 intersect with each other in the plurality of joining points (intersecting points 18), it is possible to join a pair of the first and second joining portions 16 and 17 with more stable joining strength.

In particular, when, as with this example, the ultrasonic welding is performed between the six radial ribs and the circularly shaped rib, six welding points are formed on a circumference, and it is possible to obtain the joining strength not greatly different even in comparison with a joining strength obtained in a case where the welding is performed over the whole circumferential lengths of ribs both having a circular shape.

In this example, the joining portions of the outer and inner covers are joined in 28 joining points in the whole of the exterior cover unit 1. Thereby, by joining (multi-point joining) the joining portions distributed throughout the joining surfaces of the plate-shaped members, it is possible to obtain stiffness that is similar to a case of molding a whole unit in a single body.

Further, in this example, the upper portion of the exterior cover unit 1, which is elongated in the vertical direction, is constituted by the first outer cover 2 and the first inner cover 4, and the lower portion of the exterior cover unit 1 is constituted by the second outer cover 3 and the second inner cover 5. Further, part of the first outer cover 2 is overlapped with part of the second inner cover 5. Then, in the overlapping areas A2 and A5 (refer to FIG. 2) of the first outer cover 2 and the second inner cover 5, the first joining portions 16 of the first outer cover 2 are joined to the fourth joining portions 17' of the second inner cover 5. Thereby, in comparison with a case where the first and second outer covers 2 and 3 have been prepared in advance as an integrally molded part, it is possible to reduce costs. This is because, for example, it is not necessary to use a special molding machine and a large size mold. Further, since the joining step to join the outer and inner covers also serves as a step to integrate the upper portions (2 and 4) and lower portions (3 and 5) of the exterior cover unit 1 into one body, it is possible to prevent an increase in manufacturing steps.

(Modified Examples)

To be noted, while the case of joining the cover parts to each other by the ultrasonic welding is mainly described in the example 1, the joining method is not limited to the ultrasonic welding. Also, in welding by the solvent or the heat, or adhesion via a joining medium, in a manner similar to the example 1, it is possible to obtain the stable joining strength less affected by the positional deviation. To be noted, while the second rib **17*a* is used as the energy director (triangular cross-sectional shape) of the ultrasonic welding in the example 1, for example, in a case where the adhesion is used as the joining method, it is acceptable to form an end face of the second rib 17*a*** into a flat surface suitable for coating the adhesive.

Further, while the second rib **17*a* is used as the energy director of the ultrasonic welding in the example 1, for example, it is acceptable to use the first rib 16*a* as the energy director by forming the first rib 16*a*** into the triangular cross-sectional shape.

Example 2

Next, with reference to FIGS. 5A and 5B, the exterior cover unit 20 of an example 2 will be described. While the exterior cover unit 1 having a flat appearance surface is illustrated in the example 1, by using the joining method of this disclosure, it is possible to obtain more stable joining effects, for example, in an uneven component for which stable ultrasonic welding has been difficult. In this example, a configuration in which the technique of this disclosure is applied to the exterior cover unit 20 having an uneven appearance surface will be described. Hereinafter, assuming that the elements on which the reference characters common to the example 1 are put have substantially the common configurations and functions described in the example 1, and differences from the example 1 will be mainly described.

Figure 5A:
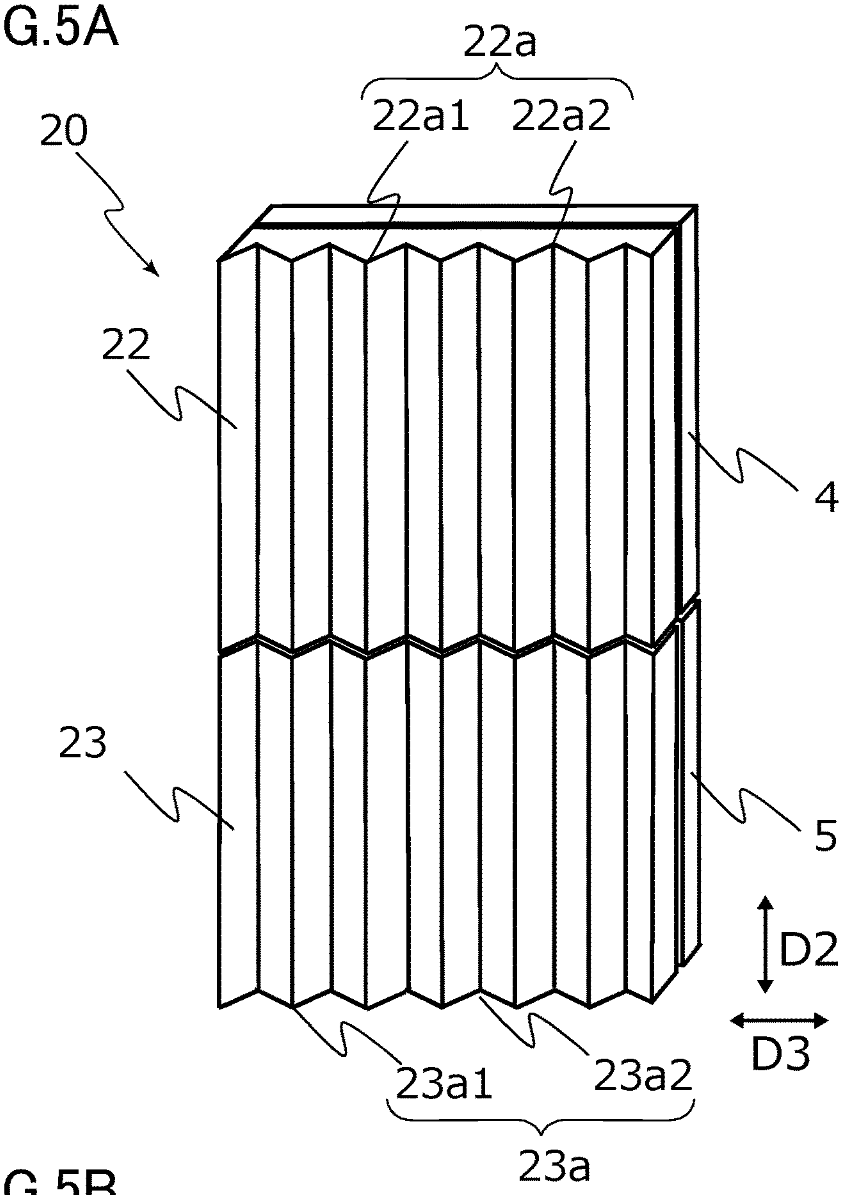
FIG. 5A is a perspective view illustrating an exterior cover unit of an example 2.

FIG. 5A is a perspective view illustrating the exterior cover unit 20 of the example 2. The exterior cover unit 20 includes a first outer cover 22, a second outer cover 23, the first inner cover 4, and the second inner cover 5. The exterior cover unit 20 is the joined structure in which a plurality of plate-shaped members are joined and integrated into one body. The first outer cover 22, the first inner cover 4, the second outer cover 23, and the second inner cover 5 respectively serve as a first, second, third, and fourth member of this example.

The first outer cover 22 (upper side outer cover) is configured to be a surface on an upper side of the front side surface (appearance surface) of an apparatus (in this example, finisher 150) into which the exterior cover unit 20 is to be assembled. The second outer cover 23 (lower side outer cover) is configured to be a surface on a lower side of the front side surface (appearance surface) of the apparatus (finisher 150) into which the exterior cover unit 20 is to be assembled. That is, the first and second outer covers 22 and 23 are included in the exterior of the casing of the apparatus into which the exterior cover unit 20 is to be assembled. As with the exterior cover unit 1 of the example 1, the exterior cover unit 20 is pivotably supported by the casing of the finisher 150 via a support shaft, not shown, and disposed to be open and closed.

Each of the first and second outer covers 22 and 23 has an uneven shape so as to add unevenness to the appearance surface of the finisher 150 for design purpose. That is, an outer surface **22*a* of the first outer cover 22 has a waved cross-sectional shape in which projecting portions 22*a*1 projecting outward and recess portions 22*a*2 recessed inward are disposed alternately. Similarly, an outer surface 23*a* of the second outer cover 23 has a waved cross-sectional shape in which projecting portions 23_a_1 projecting outward and recess portions 23_a_2** recessed inward are disposed alternately.

Figure 5B:
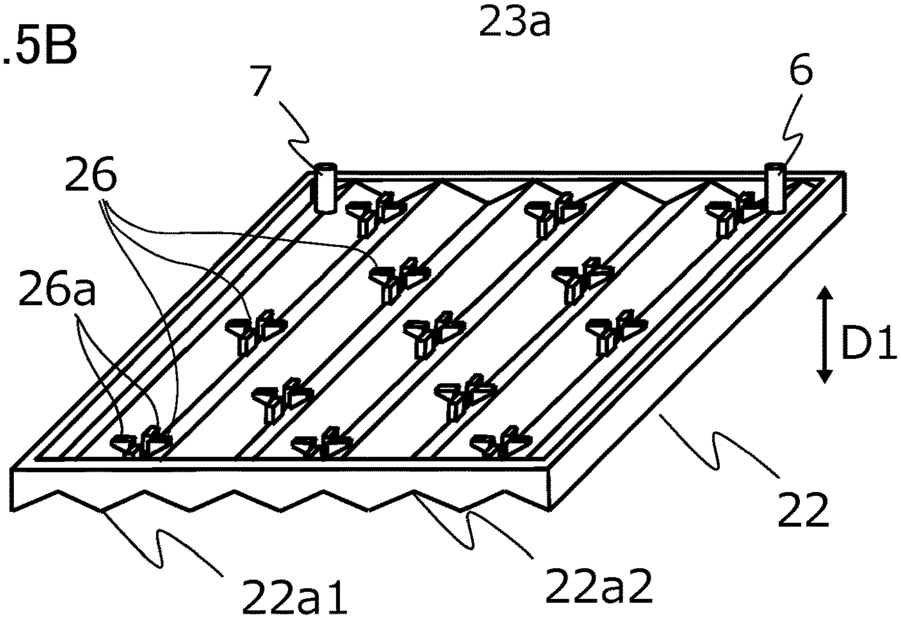
FIG. 5B is a perspective view illustrating an inner surface of an outer cover of the example 2.

FIG. 5B is a perspective view illustrating the first outer cover 22 viewed from the inside in the thickness direction D1 (from a side of a joining surface joined to the first inner cover 4). A plurality of first joining portions 26 are disposed in an inner surface 22_b_ (joining surface, first surface) of the first outer cover 22. Each of the first joining portions 26 includes four first ribs 26_a_ disposed in a cross shape when viewed in the thickness direction D1. The four first ribs 26_a_ are disposed in a radial pattern at intervals of 90 degrees (four-fold rotational symmetry). It is possible to use a rib shape similar to the example 1 (circular shape second rib 17_a_) for a rib shape of each of the second joining portions 17 of the first inner cover 4. In that case, when viewed in the thickness direction D1, each of the four first ribs 26_a_ substantially vertically intersects with the second rib 17_a_. Further, also, the second outer cover 23 includes a plurality of third joining portions, not shown, each formed into a rib shape similar to the first joining portion 26, and joined to the fourth joining portions 17' (refer to FIG. 2) of the second inner cover 5.

A method for assembling the four cover parts (22, 23, 4, and 5) is substantially the same as described in the example 1.

Figure 6:
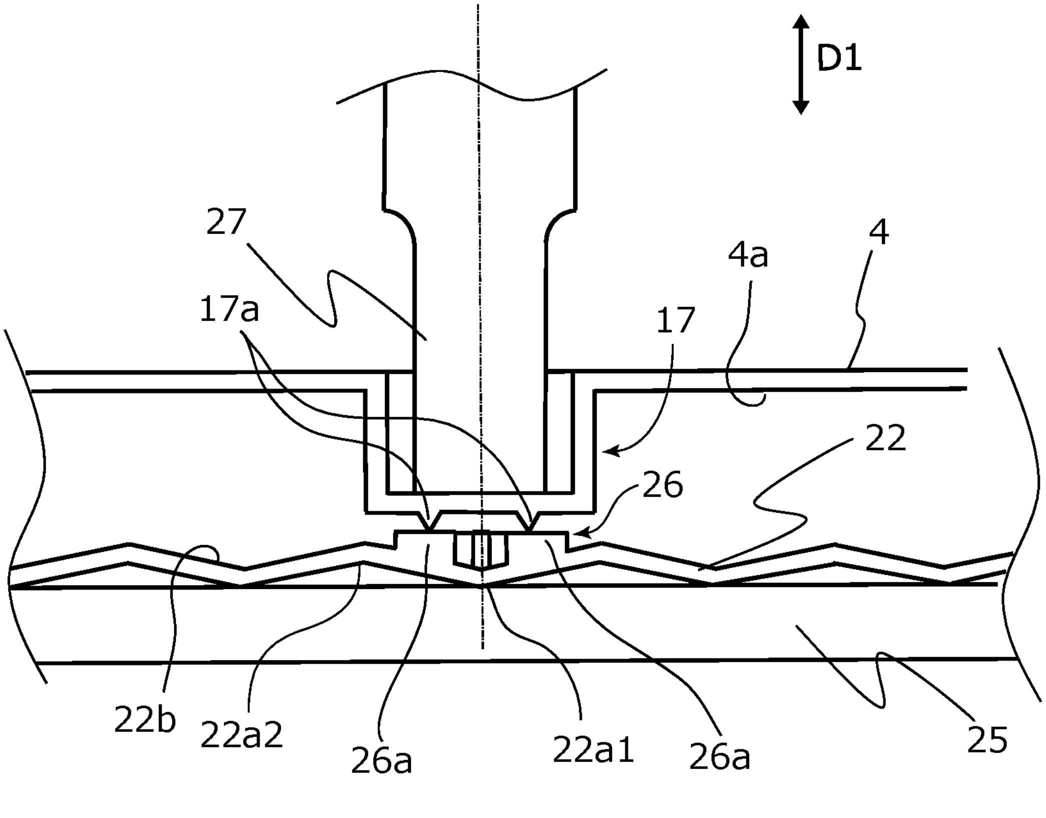
FIG. 6 is a cross-sectional view illustrating a welding step of the exterior cover unit of the example 2.

Effects of the unevenness in the appearance surface in a case of performing the ultrasonic welding will be described using FIG. 6. FIG. 6 is a cross-sectional view illustrating a state where the first outer cover 22 and the first inner cover 4 are joined to each other by the ultrasonic welding.

In a case of performing the ultrasonic welding, the first outer cover 22 is placed on a receiving table 25 so as to bring the outer surface 22_a_, which is to be the appearance surface, into contact with the receiving table 25. In this state, a horn 27 is oscillated in a pressure contact with the back surface of the second joining portion 17. Then, the second rib 17_a_, which is the energy director, is melted momentarily in contact portions with the first ribs 26_a_, and integrated with the first ribs 26_a_. Then, by welding the plurality of first joining portions 26 with the plurality of second joining portions 17, the first outer cover 22 is integrated with the first inner cover 4. By performing the similar welding between the third joining portions of the second outer cover 23 and the fourth joining portions of the second inner cover 5 and between the first joining portions 26 of the first outer cover 22 and the fourth joining portions of the second inner cover 5, the four cover parts are integrated into one body as the exterior cover unit 20.

Here, as illustrated in FIG. 6, when viewed in the thickness direction D1, the first joining portions 26 are preferably disposed in positions overlapping the projecting portions 22_a_1 of the outer surface 22_a_ (i.e., recess portions of the inner surface 22_b_). Thereby, when the horn 27 is brought into the pressure contact with the back surface of the second joining portion 17, it is possible to reduce an escape of a pressing force caused by the flexure of the first outer cover 22, and possible to easily ensure the pressing force between the first and second ribs 26_a_ and 17_a_. Further, since the second and first ribs 17_a_ and 26_a_ are respectively shaped in the circular and radial shapes, by a reason similar to the example 1, even if the relative position between the first and second joining portions 26 and 17 is deviated, reductions in a number of intersecting points, in which the first and second ribs 26_a_ and 17_a_ intersect with each other, and the joining area are less likely to occur.

Therefore, according to this example, in the case where the ultrasonic welding is performed on the cover part including the uneven appearance surface, it is possible to efficiently concentrate an ultrasonic energy on the energy director (second rib 17_a_), and join the first rib 26_a_ to the second rib 17_a_ with the stable joining strength.

To be noted, while the unevenness disposed for design purposes is illustrated in this example, this technique is applicable to a case where the unevenness is disposed for functional purposes. Further, it is not limited to a case where the unevenness is disposed throughout the appearance surface as illustrated in FIG. 5A, and this example is useful for a case where the unevenness is disposed in part of the appearance surface.

Other Examples

In the examples 1 and 2, an example configuration in which a rib shape (first ribs 16_a_ and 26_a_) of one side of joined structural bodies and a rib shape (second rib 17_a_) of the other side of the joined structural bodies perpendicularly intersect with each other when viewed in the thickness direction D1 is illustrated. However, if, when viewed in the thickness direction D1, extending directions of the rib shapes are different from each other, it is possible to obtain the stable joining strength as with the examples 1 and 2 if the joining is configured to be performed in the intersecting points of the rib shapes. Hereinafter, modified examples of the rib shapes will be described.

Figure 7A:
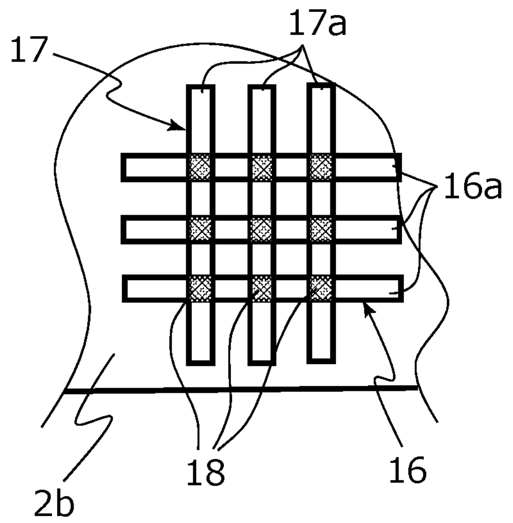
FIGS. 7A to 7C are diagrams respectively illustrating modified examples of the rib shapes of the embodiment.
Figure 7B:
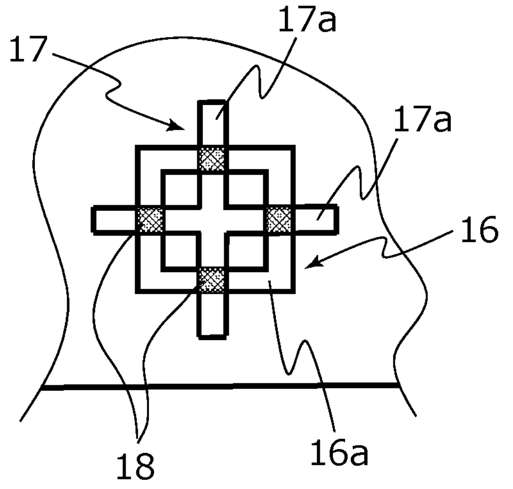
Figure 7C:
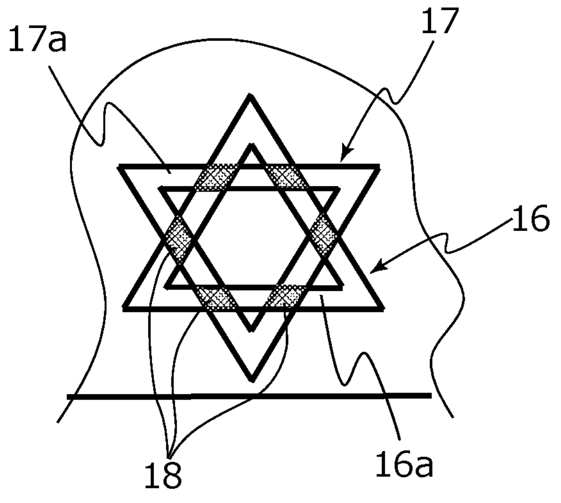

FIGS. 7A to 7C are diagrams (diagrams corresponding to FIG. 4A of the example 1) illustrating the modified examples of the rib shapes. That is, all of FIGS. 7A to 7C illustrate a positional relationship, in a plane perpendicular to the thickness direction D1, between the first and second ribs 16_a_ and 17_a_, which are both in an assembly state in which the first outer cover 2 and the first inner cover 4 are stacked.

In the modified example of FIG. 7A, the first ribs 16_a_ included in the first joining portions 16 are arranged in a rib shape in which each of the ribs extends in a first direction (for example, the width direction) and in which three ribs are disposed in a row in a second direction (for example, the height direction). When viewed in the thickness direction D1, the first and second directions are directions which intersect, preferably perpendicularly, with each other. The second ribs 17_a_ included in the second joining portions 17 are arranged in a rib shape in which each of the ribs extends in the second direction and in which three ribs are disposed in a row in the first direction. This modified example is an example of a configuration in which neither of the first joining portion 16 nor the second joining portion 17 includes a closed curve rib.

With this configuration, even if the relative position between the first and second joining portions 16 and 17 deviates slightly, an intersecting state of the first and second ribs 16_a_ and 17_a_ intersecting with each other at nine intersecting points is maintained, and the joining area (hatched area) is substantially constant.

In the modified example of FIG. 7B, the first rib 16_a_ included in the first joining portion 16 is arranged in a shape of drawing a rectangular (for example, square) closed curve, and the second ribs 17_a_ included in the second joining portion 17 is disposed in a cross shape so as to perpendicularly intersect with each side of the rectangular shape.

With this configuration, even if the relative position between the first and second joining portions 16 and 17 deviates slightly, an intersecting state of the first and second ribs 16_a_ and 17_a_ intersecting with each other at four intersecting points is maintained, and the joining area (hatched area) is substantially constant. To be noted, it is acceptable to dispose radial ribs such as the first ribs 16*a* of the example 1, or this modified example, on the first inner cover 4 such that the radial ribs serve as the energy director, and dispose the second rib 17*a* in the closed curve shape on the first outer cover 2.

In the modified example of FIG. 7C, both of the first rib 16*a* included in the first joining portion 16 and the second rib 17*a* included in the second joining portion 17 are each formed into a shape of a closed curve. Here, the first rib 16 is formed into a shape of an equilateral triangle as a first example of the closed curve, and the second rib 17*a* is formed into a shape of an inverted equilateral triangle (shape obtained by rotating the first rib 16*a* by 180 degrees) as a second example of the closed curve. The first and second closed curves intersect with each other at a plurality of intersecting points when viewed in the thickness direction. The modified example is an example of a configuration in which both of the first and second joining portions 16 and 17 are ribs shaped in the closed curve.

With this configuration, even if the relative position between the first and second joining portions 16 and 17 deviates slightly, an intersecting state of the first and second ribs 16*a* and 17*a* intersecting with each other at six intersecting points is maintained, and the joining area (hatched area) is substantially constant. It is not limited to this, and it is acceptable to replace the triangle with a polygon other than the triangle, and it is acceptable to use ellipses in which long axis directions are different from each other.

Other Embodiments

In the embodiments described above, the configuration in which, in the image forming apparatus 100, this technique is applied to the exterior cover unit on the front side of the finisher 150 is described. It is not limited to this, and it is acceptable to apply this technique to the exterior cover unit on a side other than the front side of the finisher 150 and to the exterior cover unit on any side of the printer body 101.

Industrial Applicability

The applicability of the technique of this disclosure is not limited to the image forming apparatus, and the technique of this disclosure is applicable to plate-shaped units, such as exterior cover units, which are the joined structures included in part of electronic devices and other industrial products.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-075402, filed on Apr. 28, 2022, which is hereby incorporated by reference herein in its entirety.

What is claimed is:

1. A joined structural body comprising:

a first member having a plate shape and including a first surface, a plurality of first joining portions disposed on the first surface, and a positioning portion; and a second member joined to the first member and having a plate shape, the second member including:

a second surface facing the first surface in a thickness direction of the first member, a plurality of second joining portions disposed on the second surface and joined to the plurality of first joining portions, and a positioned portion engaged with the positioning portion such that the second member is positioned with respect to the first member in a direction perpendicularly intersecting with the thickness direction, wherein distances of the plurality of first joining portions from the positioning portion in a plane perpendicularly intersecting with the thickness direction are different among the plurality of first joining portions, wherein each of the plurality of first joining portions includes a first rib projecting toward the second surface with respect to the first surface in the thickness direction, wherein each of the plurality of second joining portions includes a second rib that projects toward the first surface with respect to the second surface in the thickness direction and that intersects with the first rib when viewed in the thickness direction, wherein the first rib and the second rib are joined to each other at an intersecting point where the first rib and the second rib intersect with each other when viewed in the thickness direction, wherein when viewed in the thickness direction, either one of the first rib and the second rib is shaped in a closed curve, and wherein when viewed in the thickness direction, the other of the first rib and the second rib is one of a plurality of ribs extending from an inside to an outside of the closed curve.

2. The joined structural body according to claim 1, wherein when viewed in the thickness direction, the first rib and the second rib perpendicularly intersect with each other.

3. The joined structural body according to claim 1, wherein the closed curve has a circular shape, and wherein the plurality of ribs are disposed in a radial pattern having rotational symmetry.

4. The joined structural body according to claim 1, wherein the closed curve has a rectangular shape, and wherein the plurality of ribs are disposed in a cross shape so as to perpendicularly intersect with each side of the rectangular shape.

5. The joined structural body according to claim 1, wherein each of the first member and the second member is formed of a resin material, and wherein the first rib and the second rib are welded to each other at the intersecting point.

6. The joined structural body according to claim 5, wherein one of the first rib and the second rib is an energy director welded to the other of the first rib and the second rib by ultrasonic welding.

7. The joined structural body according to claim 1, wherein the first member includes an outer surface on a side of the first member opposite to the first surface, wherein the outer surface is configured to be an appearance surface of an apparatus into which the joined structural body is to be assembled, wherein the outer surface includes unevenness in the thickness direction, wherein when viewed in the thickness direction, the first rib is disposed in a position overlapping a projecting portion in the unevenness of the fifthouter surface, and wherein the second rib is an energy director welded to the first rib by ultrasonic welding.

8. The joined structural body according to claim 1, wherein the first rib and the second rib are adhered to each other at the intersecting point with an adhesive.

9. The joined structural body according to claim 1, wherein the first member includes a outer surface disposed on a side of the first member opposite to the first surface, and wherein the outer surface is configured to be an appearance surface of an apparatus into which the joined structural body is to be assembled.

10. The joined structural body according to claim 9, wherein the outer surface includes unevenness in the thickness direction.

11. The joined structural body according to claim 1, wherein the joined structural body is configured to be at least part of a side surface of an apparatus into which the joined structural body is to be assembled, wherein the joined structural body is an opening and closing unit which is configured to open and close between a closed position where the joined structural body covers an opening provided in the side surface of the apparatus and an opening position where the joined structural body allows the opening to be exposed.

12. An image forming apparatus comprising:

an apparatus body including an image forming unit configured to form an image on a recording material; and the joined structural body according to claim 1, the joined structural body being configured to form at least part of a side surface of the apparatus body.

13. The image forming apparatus according to claim 12, wherein the joined structural body is configured to open and close between a closed position where the joined structural body covers an opening provided in the apparatus body and an opening position where the joined structural body allows the opening to be exposed.

14. A finisher comprising:

a casing;

a process unit configured to perform a predetermined process on a recording material, the process unit being housed in the casing; and the joined structural body according to claim 1, the joined structural body being supported by the casing.

15. A joined structural body comprising:

a first member having a plate shape and including a first surface, a plurality of first joining portions disposed on the first surface, and a positioning portion; and a second member joined to the first member and having a plate shape, the second member including:

a second surface facing the first surface in a thickness direction of the first member, a plurality of second joining portions disposed on the second surface and joined to the plurality of first joining portions, and a positioned portion engaged with the positioning portion such that the second member is positioned with respect to the first member in a direction perpendicularly intersecting with the thickness direction, wherein distances of the plurality of first joining portions from the positioning portion in a plane perpendicularly intersecting with the thickness direction are different among the plurality of first joining portions, wherein each of the plurality of first joining portions includes a first rib projecting toward the second surface with respect to the first surface in the thickness direction, wherein each of the plurality of second joining portions includes a second rib that projects toward the first surface with respect to the second surface in the thickness direction and that intersects with the first rib when viewed in the thickness direction, wherein the first rib and the second rib are joined to each other at an intersecting point where the first rib and the second rib intersect with each other when viewed in the thickness direction, wherein when viewed in the thickness direction, the first rib of one of the first joining portions intersects with the second rib of one of the second joining portions in a plurality of intersecting points, and wherein the first rib and the second rib are joined to each other at each of the plurality of intersecting points.

16. A joined structural body comprising:

a first member having a plate shape and including a first surface, a plurality of first joining portions disposed on the first surface, and a positioning portion; and a second member joined to the first member and having a plate shape, the second member including:

a second surface facing the first surface in a thickness direction of the first member, a plurality of second joining portions disposed on the second surface and joined to the plurality of first joining portions, and a positioned portion engaged with the positioning portion such that the second member is positioned with respect to the first member in a direction perpendicularly intersecting with the thickness direction, wherein distances of the plurality of first joining portions from the positioning portion in a plane perpendicularly intersecting with the thickness direction are different among the plurality of first joining portions, wherein each of the plurality of first joining portions includes a first rib projecting toward the second surface with respect to the first surface in the thickness direction, wherein each of the plurality of second joining portions includes a second rib that projects toward the first surface with respect to the second surface in the thickness direction and that intersects with the first rib when viewed in the thickness direction, wherein the first rib and the second rib are joined to each other at an intersecting point where the first rib and the second rib intersect with each other when viewed in the thickness direction, wherein when viewed in the thickness direction, each of the plurality of first joining portions includes a plurality of first ribs each extending in a first direction and disposed in a row in a second direction intersecting with the first direction, wherein the first rib is one of the plurality of first ribs, wherein when viewed in the thickness direction, each of the plurality of second joining portions includes a plurality of second ribs each extending in the second direction and disposed in a row in the first direction, and wherein the second rib is one of the plurality of second ribs.

17. A joined structural body comprising:

a first member having a plate shape and including a first surface, a plurality of first joining portions disposed on the first surface, and a positioning portion; and a second member joined to the first member and having a plate shape, the second member including:

a second surface facing the first surface in a thickness direction of the first member, a plurality of second joining portions disposed on the second surface and joined to the plurality of first joining portions, and a positioned portion engaged with the positioning portion such that the second member is positioned with respect to the first member in a direction perpendicularly intersecting with the thickness direction, wherein distances of the plurality of first joining portions from the positioning portion in a plane perpendicularly intersecting with the thickness direction are different among the plurality of first joining portions, wherein each of the plurality of first joining portions includes a first rib projecting toward the second surface with respect to the first surface in the thickness direction, wherein each of the plurality of second joining portions includes a second rib that projects toward the first surface with respect to the second surface in the thickness direction and that intersects with the first rib when viewed in the thickness direction, wherein the first rib and the second rib are joined to each other at an intersecting point where the first rib and the second rib intersect with each other when viewed in the thickness direction, wherein the first rib is shaped in a first closed curve, and wherein when viewed in the thickness direction, the second rib is shaped in a second closed curve intersecting with the first closed curve at a plurality of intersecting points.

18. A joined structural body comprising:

a first member having a plate shape and including a first surface, a plurality of first joining portions disposed on the first surface, and a positioning portion;

a second member joined to the first member and having a plate shape, the second member including:

a second surface facing the first surface in a thickness direction of the first member, a plurality of second joining portions disposed on the second surface and joined to the plurality of first joining portions, and a positioned portion engaged with the positioning portion such that the second member is positioned with respect to the first member in a direction perpendicularly intersecting with the thickness direction;

a third member including a third surface and a plurality of third joining portions disposed on the third surface; and a fourth member including a fourth surface facing the third surface in the thickness direction and a plurality of fourth joining portions disposed on the fourth surface, the plurality of fourth joining portions being joined to the plurality of third joining portions, wherein distances of the plurality of first joining portions from the positioning portion in a plane perpendicularly intersecting with the thickness direction are different among the plurality of first joining portions, wherein each of the plurality of first joining portions includes a first rib projecting toward the second surface with respect to the first surface in the thickness direction, wherein each of the plurality of second joining portions includes a second rib that projects toward the first surface with respect to the second surface in the thickness direction and that intersects with the first rib when viewed in the thickness direction, wherein the first rib and the second rib are joined to each other at an intersecting point where the first rib and the second rib intersect with each other when viewed in the thickness direction, wherein when viewed in the thickness direction, the first surface and the fourth surface include an overlapping area in which part of the first surface and part of the fourth surface overlap each other, and wherein the first member, the second member, the third member, and the fourth member are integrated by joining some of the plurality of fourth joining portions and some of the plurality of first joining portions to each other in the overlapping area.

19. The joined structural body according to claim 18, wherein each of the plurality of third joining portions includes a rib having the same shape as the first rib included in each of the plurality of first joining portion, and wherein each of the plurality of fourth joining portions includes a rib having the same shape as the second rib included in each of the plurality of second joining portion.

* * * * *